US010594361B2

(12) United States Patent
Miyashita

(10) Patent No.: US 10,594,361 B2
(45) Date of Patent: Mar. 17, 2020

(54) COMMUNICATION SYSTEM, COMMUNICATION APPARATUS, COMMUNICATION METHOD, HOPPING PATTERN DETERMINING METHOD AND PROGRAM

(71) Applicant: Sony Interactive Entertainment Inc., Tokyo (JP)

(72) Inventor: Takashi Miyashita, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/305,434

(22) PCT Filed: Feb. 15, 2017

(86) PCT No.: PCT/JP2017/005524
§ 371 (c)(1),
(2) Date: Nov. 29, 2018

(87) PCT Pub. No.: WO2017/217010
PCT Pub. Date: Dec. 21, 2017

(65) Prior Publication Data
US 2019/0356352 A1    Nov. 21, 2019

(30) Foreign Application Priority Data
Jun. 15, 2016  (JP) .................................. 2016-118940

(51) Int. Cl.
*H04B 1/7143*    (2011.01)
*H04B 1/7136*    (2011.01)

(52) U.S. Cl.
CPC ......... *H04B 1/7143* (2013.01); *H04B 1/7136* (2013.01); *H04B 2001/71367* (2013.01)

(58) Field of Classification Search
CPC ................ H04B 1/7143; H04B 1/7136; H04B 2001/71367
See application file for complete search history.

(56) References Cited

U.S. PATENT DOCUMENTS 6,240,126 B1 *   5/2001  Ohashi ................. H04B 1/7143
                                                             375/130
2006/0133543 A1    6/2006  Linsky
(Continued)

FOREIGN PATENT DOCUMENTS

JP    04313926 A    11/1992
JP    07107010 A     4/1995
(Continued)

OTHER PUBLICATIONS

International Search Report for corresponding PCT Application No. PCT/JP2017/005524, 4 pages, dated May 16, 2017.
(Continued)

*Primary Examiner* — Vineeta S Panwalkar
(74) *Attorney, Agent, or Firm* — Matthew B. Dernier, Esq.

(57) ABSTRACT

There are provided a communication system, a communication apparatus, a communication method, a hopping pattern determining method, and a program for suitably setting a hopping pattern of frequencies for data communication. A hopping pattern data storing part stores hopping pattern data denoting the hopping pattern of frequencies for data communication. A frequency switching part switches the frequencies for data communication with a communication part in accordance with the hopping pattern. A reception part receives a signal transmitted at frequencies different from those of the hopping pattern over a period where data communication is not performed. A hopping pattern determining part determines a new hopping pattern on the basis
(Continued)

of reception quality of the signal received by the communication part.

12 Claims, 14 Drawing Sheets

(56) References Cited

U.S. PATENT DOCUMENTS

| | | | |
|---|---|---|---|
| 2006/0140251 A1 | 6/2006 | Brown | |
| 2008/0165832 A1 | 7/2008 | Fukuda | |
| 2010/0036463 A1* | 2/2010 | Bange | A61N 1/37252 |
| | | | 607/60 |

FOREIGN PATENT DOCUMENTS

| | | | |
|---|---|---|---|
| JP | 2001024561 A | 1/2001 |
| JP | 2002252573 A | 9/2002 |
| JP | 2005033418 A | 2/2005 |

OTHER PUBLICATIONS

International Preliminary Report on Patentability and Written Opinion for corresponding PCT Application No. PCT/JP2017/005524, 8 pages, dated Dec. 27, 2018.
Extended European Search Report for corresponding EP Application No. 17812919.3, 5 pages, dated Jan. 21, 2020.

* cited by examiner

FIG.4

| HOPPING INDEX | CHANNEL IDENTIFIER |
|---|---|
| 1 | CH2 |
| 2 | CH12 |
| 3 | CH32 |
| 4 | CH42 |
| 5 | CH52 |
| 6 | CH72 |
| 7 | CH82 |
| 8 | CH3 |
| 9 | CH13 |
| 48 | CH61 |
| 49 | CH71 |
| 50 | CH81 |

FIG.5

| SCAN INDEX | CHANNEL IDENTIFIER |
|---|---|
| 1 | CH7 |
| 2 | CH8 |
| 3 | CH9 |
| 4 | CH13 |
| 5 | CH14 |
| 6 | CH21 |
| 7 | CH22 |
| 8 | CH35 |
| 9 | CH36 |
| 29 | CH62 |
| 30 | CH70 |
| 31 | CH79 |

FIG. 6A

| TIMING NO. | HOPPING INDEX | SCAN INDEX |
|---|---|---|
| 0 | 1 | 1 |
| 1 | 2 | 2 |
| 2 | 3 | 3 |
| 3 | 4 | 4 |
| 4 | 5 | 5 |
| 5 | 6 | 6 |
| 6 | 7 | 7 |
| 7 | 8 | 8 |
| 8 | 9 | 9 |
| 9 | 10 | -- |
| 10 | 11 | 10 |
| 29 | 30 | -- |
| 30 | 31 | 28 |
| 31 | 32 | 29 |
| 32 | 33 | 30 |
| 33 | 34 | 31 |
| 34 | 35 | 1 |
| 35 | 36 | 2 |

FIG.6B

| TIMING NO. | HOPPING INDEX | SCAN INDEX |
|---|---|---|
| 36 | 37 | 3 |
| 46 | 47 | 12 |
| 47 | 48 | 13 |
| 48 | 49 | 14 |
| 49 | 50 | – |
| 50 | 1 | 15 |
| 51 | 2 | 16 |
| 52 | 3 | 17 |
| 897 | 48 | 3 |
| 898 | 49 | 4 |
| 899 | 50 | – |
| 900 | 1 | – |
| 901 | 2 | – |
| 998 | 49 | – |
| 999 | 50 | – |

FIG.7A

| TIMING NO. | HOPPING INDEX | SCAN INDEX |
|---|---|---|
| 0 | 1 | 1 |
| 1 | 2 | 2 |
| 2 | 3 | 3 |
| 3 | 4 | 4 |
| 4 | 5 | 5 |
| 5 | 6 | 6 |
| 6 | 7 | 7 |
| 7 | 8 | 8 |
| 8 | 9 | 9 |
| 9 | 10 | - |
| 10 | 11 | 10 |
| 35 | 36 | 33 |
| 36 | 37 | 34 |
| 37 | 1 | 35 |
| 38 | 2 | 36 |
| 39 | 3 | - |

FIG.7B

| TIMING NO. | HOPPING INDEX | SCAN INDEX |
|---|---|---|
| 40 | 4 | 37 |
| 46 | 10 | 43 |
| 47 | 11 | 44 |
| 48 | 12 | 1 |
| 49 | 13 | - |
| 50 | 14 | 2 |
| 51 | 15 | 3 |
| 52 | 16 | 4 |
| 897 | 10 | 17 |
| 898 | 11 | 18 |
| 899 | 12 | - |
| 900 | 13 | - |
| 901 | 14 | - |
| 998 | 37 | - |
| 999 | 1 | - |

COMMUNICATION SYSTEM, COMMUNICATION APPARATUS, COMMUNICATION METHOD, HOPPING PATTERN DETERMINING METHOD AND PROGRAM

TECHNICAL FIELD

The present invention relates to a communication system, a communication apparatus, a communication method, a hopping pattern determining method, and a program.

BACKGROUND ART

There exist frequency hopping techniques for switching frequencies according to a hopping pattern in carrying out communication, the techniques being intended to implement communication in a manner resistant to noise and interference from other systems.

One such technique is described in PTL 1, the technique involving carrying out communication by switching from one frequency slot to another in accordance with a frequency hopping pattern. According to this technique, if there is interference in the frequency slot currently used as part of the frequency hopping pattern, that frequency slot is removed from the frequency hopping pattern. Also according to this technique, if there is no interference during reception using a communication idle time in a frequency slot yet to be used as part of the frequency hopping pattern, that frequency slot is added to the frequency hopping pattern.

CITATION LIST

Patent Literature

[PTL 1] JP 1995-107010A

SUMMARY

Technical Problem

In recent years, studies have been made of game systems that involve allowing a game apparatus executing a game program to transmit by wireless communication a video image indicative of game playing status to a head-mounted display (HMD) equipped with sensors such as a motion sensor. Also studied with regard to such game systems is how to let the HMD transmit through wireless communication the data denoting the result of detection by the sensors to the game apparatus. Such an arrangement, when implemented, enables the game playing status to be changed in accordance with the detection result reflecting changes in the position and direction of a user's head.

In the case where wireless communication is performed for the above-mentioned purpose, for example, it is important to shorten the time period from the time the data representing the sensor-detected result is generated by the transmitting apparatus until the data is made available to the receiving apparatus (the time period is called latency) in order to reduce the user's feeling of discomfort.

One way of shortening the latency may be by improving the reception quality such as packet arrival rate. In this respect, if it is possible to set more appropriately the hopping pattern of frequencies for data communication than with the technique described in PTL 1, the reception quality can be expected to be improved.

The present invention has been made in view of the above circumstances. An object of the invention is therefore to provide a communication system, a communication apparatus, a communication method, a hopping pattern determining method, and a program for appropriately setting the hopping pattern of frequencies for data communication.

Solution to Problem

In solving the above problem and according to the present invention, there is provided a communication system including a first communication apparatus and a second communication apparatus. The first communication apparatus includes: a first communication part; a first storage part configured to store hopping pattern data denoting a hopping pattern of frequencies for data communication; and a first control part configured to switch the frequencies for data communication with the first communication part in accordance with the hopping pattern. The second communication apparatus includes: a second communication part; a second storage part configured to store the hopping pattern data; and a second control part configured to switch the frequencies for data communication with the second communication part in accordance with the hopping pattern. Over a period where data communication is not performed, the first communication part transmits a signal to the second communication part at frequencies different from those of the hopping pattern. The second control part determines a new hopping pattern on the basis of reception quality of the signal received by the second communication part.

In a preferred embodiment of the present invention, the second control part may determine the new hopping pattern on the basis of the reception quality of data transmitted from the first communication part at frequencies included in the hopping pattern and received by the second communication part and the reception quality of the signal transmitted from the first communication part and received by the second communication part.

In another preferred embodiment of the present invention, the first control part may perform control to make the first communication part execute two operations alternately, one of the two operations being communication of the data in accordance with the hopping pattern, the other operation being transmission of the signal at frequencies different from those of the hopping pattern.

Alternatively, the first control part may perform control to make the first communication part execute two operations alternately, one of the two operations being consecutive multiple-time transmission of the same data at one of the frequencies included in the hopping pattern, the other operation being transmission of the signal at frequencies different from those of the hopping pattern.

In the above case, the first control part may perform control to make the first communication part transmit the signal at a frequency different form that of the immediately preceding transmission of the signal while transmitting the signal at frequencies different from those of the hopping pattern.

In another preferred embodiment of the present invention, the first control part may perform control to make the first communication part transmit the signal multiple times at a frequency after the hopping pattern is determined until another hopping pattern is determined.

Also according to the present invention, there is provided a communication apparatus including: a communication part; a storage part configured to store hopping pattern data denoting a hopping pattern of frequencies for data communication; and a control part configured to switch the frequencies for data communication with the communication part in accordance with the hopping pattern. Over a period where data communication is not performed, the communication part transmits a signal at frequencies different from those of the hopping pattern.

Also according to the present invention, there is provided a communication apparatus including: a communication part; a storage part configured to store hopping pattern data denoting a hopping pattern of frequencies for data communication; and a control part configured to switch the frequencies for data communication with the communication part in accordance with the hopping pattern. Over a period where data communication is not performed, the communication part receives a signal at frequencies different from those of the hopping pattern. The control part determines a new hopping pattern on the basis of reception quality of the signal received by the communication part.

Also according to the present invention, there is provided a communication method including the steps of: switching frequencies of a hopping pattern for data communication with a communication part in accordance with the hopping pattern denoted by hopping pattern data stored in a storage part; and transmitting a signal at frequencies different from those of the hopping pattern over a period where data communication is not performed.

Also according to the present invention, there is provided a hopping pattern determining method including the steps of: switching frequencies of a hopping pattern for data communication with a communication part in accordance with the hopping pattern denoted by hopping pattern data stored in a storage part; receiving a signal at frequencies different from those of the hopping pattern over a period where data communication is not performed; and determining a new hopping pattern on the basis of reception quality of the signal received by the communication part.

Also according to the present invention, there is provided a program for causing a computer to perform a procedure including: switching frequencies of a hopping pattern for data communication with a communication part in accordance with the hopping pattern denoted by hopping pattern data stored in a storage part; and transmitting a signal at frequencies different from those of the hopping pattern over a period where data communication is not performed.

Also according to the present invention, there is provided a program for causing a computer to perform a procedure including: switching frequencies of a hopping pattern for data communication with a communication part in accordance with the hopping pattern denoted by hopping pattern data stored in a storage part; receiving a signal at frequencies different from those of the hopping pattern over a period where data communication is not performed; and determining a new hopping pattern on the basis of reception quality of the signal received by the communication part.

BRIEF DESCRIPTION OF DRAWINGS

FIG. 4 is a schematic diagram depicting an example of hopping pattern data.

FIG. 5 is a schematic diagram depicting another example of scan pattern data.

FIG. 6A is a schematic diagram depicting an example of timing management data.

FIG. 6B is another schematic diagram depicting the example of timing management data.

FIG. 7A is a schematic diagram depicting another example of timing management data.

FIG. 7B is another schematic diagram depicting the other example of timing management data.

DESCRIPTION OF EMBODIMENTS

Some preferred embodiments of the present invention are described below with reference to the accompanying drawings.

Figure 1:
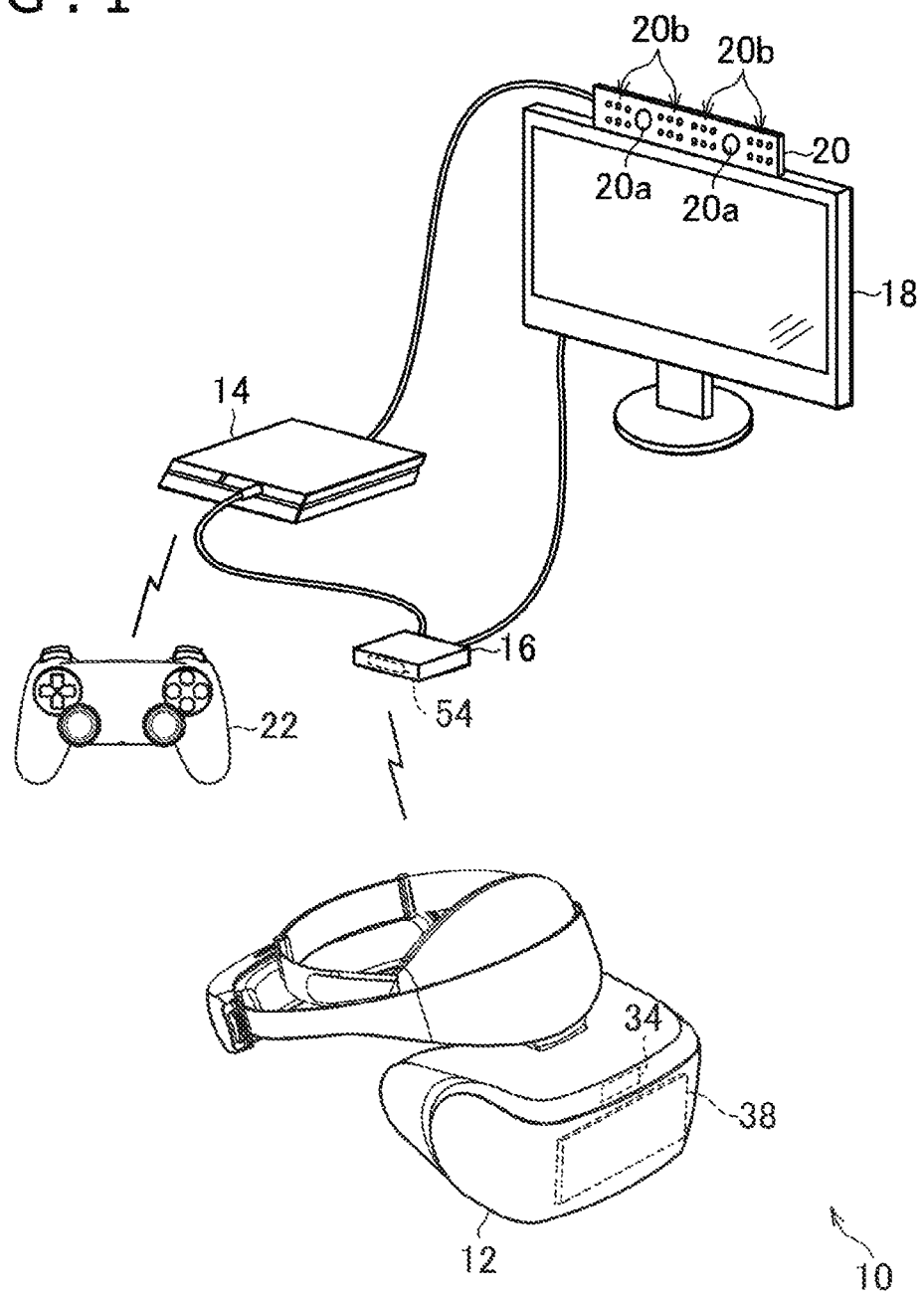
FIG. 1 is a schematic diagram depicting a typical overall configuration of an entertainment system as one embodiment of the present invention.
Figure 2A:
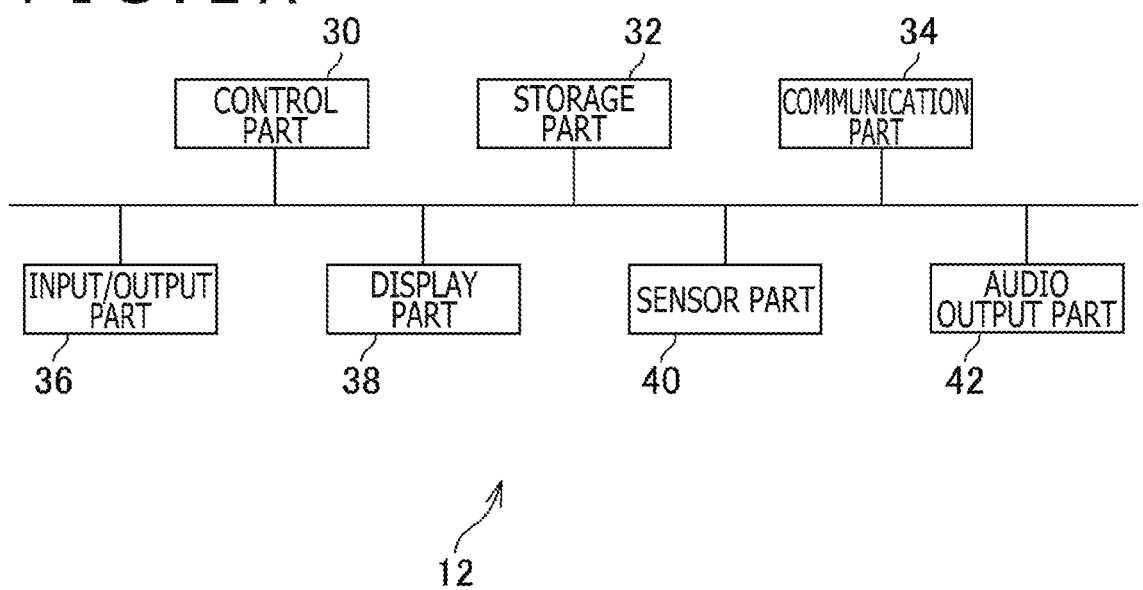
FIG. 2A is a schematic diagram depicting a typical configuration of a head-mounted display as part of the embodiment.
Figure 2B:
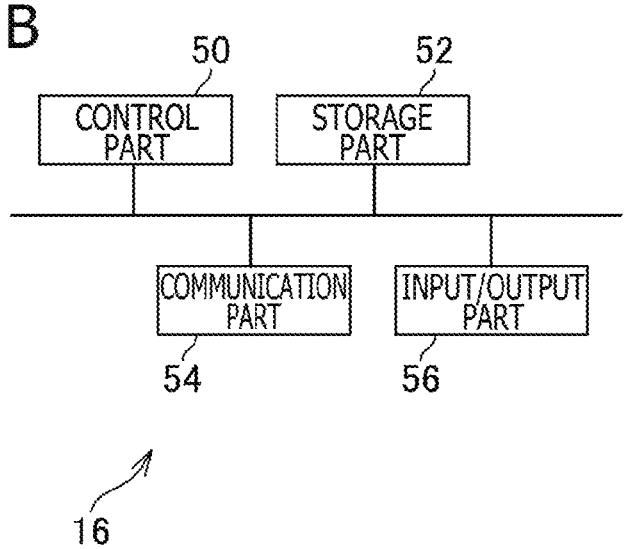
FIG. 2B is a schematic diagram depicting a typical configuration of a relay apparatus as part of the embodiment.

FIG. 1 is a schematic diagram depicting a typical overall configuration of an entertainment system 10 as one embodiment of the present invention. FIG. 2A is a schematic diagram depicting a typical configuration of a head-mounted display (HMD) 12 as part of the embodiment. FIG. 2B is a schematic diagram depicting a typical configuration of a relay apparatus 16 as part of the embodiment.

As depicted in FIG. 1, the entertainment system 10 embodying the present invention includes the HMD 12, an entertainment apparatus 14, the relay apparatus 16, a display 18, a camera/microphone unit 20, and a controller 22.

The HMD 12 of this embodiment includes as depicted in FIG. 2A, for example, a control part 30, a storage part 32, a communication part 34, an input/output part 36, a display part 38, a sensor part 40, and an audio output part 42.

The control part 30 is, for example, a program-controlled device such as a microprocessor operating in accordance with programs installed in the HMD 12.

The storage part 32 is, for example, a storage element such as a read-only memory (ROM) or a random access memory (RAM). The storage part 32 stores, for example, programs to be executed by the control part 30.

The communication part 34 is, for example, a communication interface such as a wireless local area network (LAN) module. In this embodiment, as depicted in FIG. 2, the communication part 34 is arranged on the top front of the HMD 12.

The input/output part 36 is, for example, an input/output port such as a High-Definition Multimedia Interface (HDMI; registered trademark) port, a universal serial bus (USB) port, or an auxiliary (AUX) port.

The display part 38 is arranged on the front of the HMD 12. This is, for example, a display such as a liquid crystal display or an organic EL display that may display images generated by the entertainment apparatus 14. The display part 38 is housed in the enclosure of the HMD 12. The display part 38 may receive a video signal output from the entertainment apparatus 14 and repeated by the relay apparatus 16, for example, and output the image represented by the received video signal. The display part 38 of this embodiment is configured to display three-dimensional images by displaying a right-eye image and a left-eye image, for example. Alternatively, the display part 38 may be configured to display only two-dimensional images in place of three-dimensional images.

The sensor part 40 is, for example, a sensor arrangement including a motion sensor capable of detecting acceleration and angular velocity. The sensor part 40 outputs, at a predetermined sampling rate, the detection results such as the rotation amount and travel distance of the HMD 12 to the control part 30.

The audio output part 42 is, for example, headphones or speakers that output sounds represented by audio data generated by the entertainment apparatus 14. The audio output part 42 may receive an audio signal output from the entertainment apparatus 14 and repeated by the relay apparatus 16, for example, and output the sounds represented by the received audio signal.

The entertainment apparatus 14 of this embodiment is, for example, a computer such as a game console, a digital versatile disc (DVD) player, or a Blu-ray (registered trademark) player. The entertainment apparatus 14 of this embodiment generates images and sounds by executing stored game programs or by reproducing content recorded on optical disks, for example. Also, the entertainment apparatus 14 outputs the video signal representing images to be generated and the audio signal representative of sounds to be generated to the HMD 12 or to the display 18 via the relay apparatus 16.

The relay apparatus 16 of this embodiment is a computer that repeats the video signal and the audio signal coming from the entertainment apparatus 14 for output to the HMD 12 or to the display 18.

The relay apparatus 16 of this embodiment includes as depicted in FIG. 2B, for example, a control part 50, a storage part 52, a communication part 54, and an input/output part 56.

The control part 50 is a program-controlled device such as a central processing unit (CPU) operating in accordance with programs installed in the relay apparatus 16.

The storage part 52 is a storage element such as a ROM or a RAM. The storage part 52 stores, for example, programs to be executed by the control part 50.

The communication part 54 is, for example, a communication interface such as a wireless LAN module.

The input/output part 56 is, for example, an input/output port such as a High-Definition Multimedia Interface (HDMI; registered trademark) port or a USB port.

The display 18 of this embodiment is, for example, a liquid crystal display that displays images represented by the video signal output from the entertain apparatus 14.

The camera/microphone unit 20 of this embodiment includes cameras 20a and microphones 20b, for example, the cameras 20a capturing images of a target object and outputting the captured images to the entertainment apparatus 14, the microphones 20b collecting sounds from the surroundings and converting the collected sounds into audio data for output to the entertainment apparatus 14. Incidentally, the cameras 20a of this embodiment constitute a stereo camera.

The HMD 12 and the relay apparatus 16 can exchange data therebetween by wireless communication, for example. The entertainment apparatus 14 and the relay apparatus 16 are connected with each other via an HDMI cable or a USB cable, for example. The relay apparatus 16 and the display 18 are connected with each other via an HDMI cable, for example. The entertainment apparatus 14 and the camera/microphone unit 20 are connected with each other via an AUX cable, for example.

The controller 22 of this embodiment is an operation input apparatus used to perform input operations to the entertainment apparatus 14. A user may perform diverse input operations such as pressing of arrow keys and buttons on the controller 22 and tilting of its operating sticks, for example. In this embodiment, the controller 22 outputs input data associated with the input operations to the entertainment apparatus 14. The controller 22 of this embodiment is equipped with a USB port. When connected with the entertainment apparatus 14 via a USB cable, the controller 22 can output the input data to the entertainment apparatus 14 in wired fashion. The controller 22 further includes a wireless communication module that can output the input data wirelessly to the entertainment apparatus 14.

In this embodiment, when a game program is being executed by the entertainment apparatus 14, for example, the sensor part 40 of the HMD 12 generates detection result data representative of the position and direction of the HMD 12 as well as changes in its position and direction at a predetermined sampling rate. The HMD 12 transmits the generated data to the relay apparatus 16. In turn, the relay apparatus 16 transmits the data received from the HMD 12 to the entertainment apparatus 14.

On the basis of the data received from the relay apparatus 16, the entertainment apparatus 14 performs diverse processing on the currently executed game program. For example, in a situation where the display part 38 of the HMD 12 displays images indicating how things look in the visual line direction from the viewpoint arranged in a virtual space, the entertainment apparatus 14 changes the position of the viewpoint and the visual line direction in keeping with the received data. In this manner, the images displayed on the display part 38 of the HMD 12 are changed in accordance with the position and direction of the HMD 12.

In this embodiment, the communication of data takes place between the HMD 12 and the relay apparatus 16 at a cycle of a predetermined time (e.g., 1 second), the data being typically the detection results from the sensor part 40 for use in the processing by the entertainment apparatus 14. In the ensuing paragraphs, the data used in the processing by the entertainment apparatus 14 will be referred to as the target data, and the cycle as the communication cycle.

In this embodiment, the communication cycle is divided into a predetermined number of periods. In the description that follows, the periods will each be referred to as a unit period. For example, the communication cycle is divided into 1,000 unit periods each being 1 millisecond long. The unit periods are categorized into periods A and B. A typical period A is depicted in FIG. 3A, and a typical period B is illustrated in FIG. 3B.

Figure 3A:
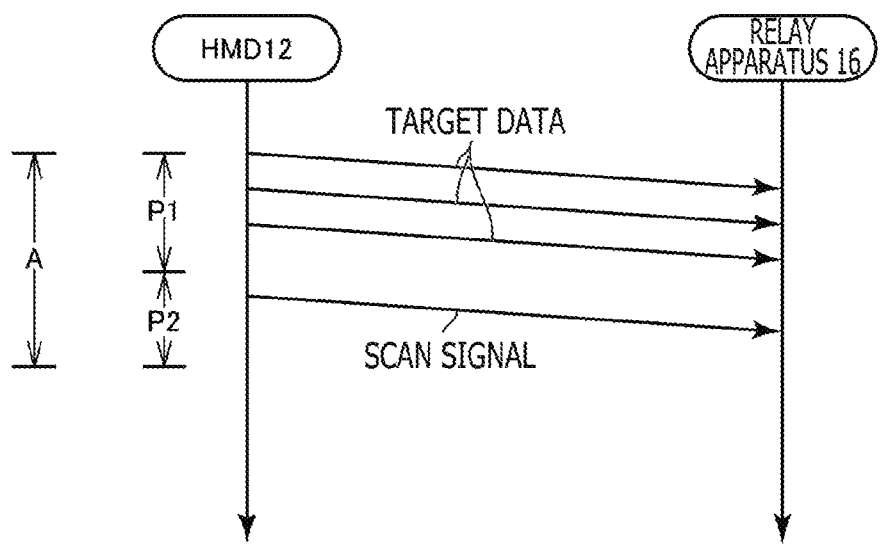
FIG. 3A is a schematic diagram depicting a typical period A.
Figure 3B:
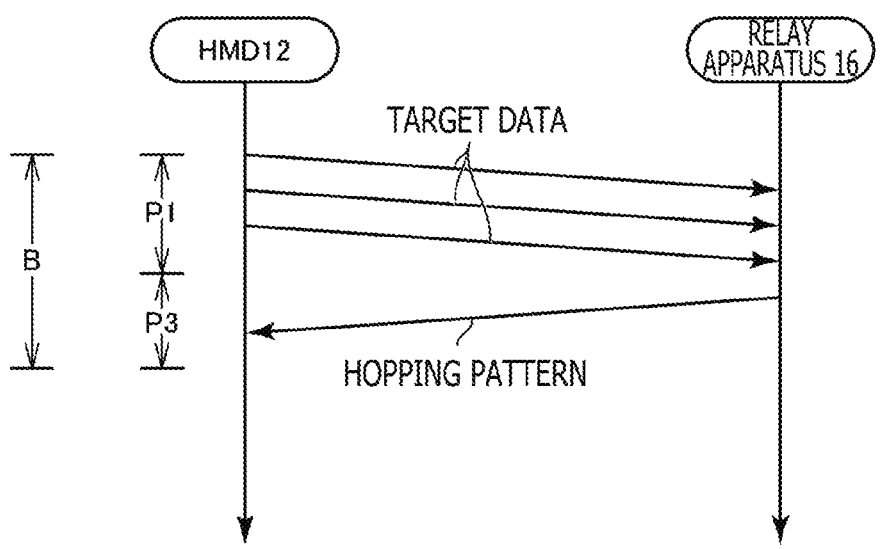
FIG. 3B is a schematic diagram depicting a typical period B.

The period A in FIG. 3A includes a target data transmission sub-period P1 and a scan signal transmission sub-period P2. The period B in FIG. 3B on the other hand includes a target data transmission sub-period P1 and a hopping pattern notification sub-period P3.

In this embodiment, the target data transmission sub-period P1 here is a period in which the above-mentioned target data is transmitted, for example. In this embodiment, multiple channels each associated with a frequency for use in communication are set beforehand. Part of these multiple channels are included in a hopping pattern. According to the hopping pattern set on the HMD 12 and the relay apparatus 16, the HMD 12 transmits the target data while switching from one channel to another in each target data transmission sub-period P1. In this embodiment, as depicted in FIGS. 3A and 3B, the same target data is transmitted multiple times (e.g., three times) over one channel in the target data transmission sub-period P1.

The scan signal transmission sub-period P2 is a period in which a scan signal is transmitted from the HMD 12 to the relay apparatus 16 in order to verify the quality of reception by the relay apparatus 16. In this embodiment, the scan signal is transmitted over channels not included in the hopping pattern.

In this embodiment, the relay apparatus 16 does not transmit to the HMD 12 any packet indicative of whether or not the target data or the scan signal is received (e.g., acknowledgement (ACK) or negative acknowledgement (NACK)). Also in this embodiment, the target data and the scan signal are not retransmitted upon transmission time-out.

In this embodiment, a new hopping pattern is determined on the basis of the reception quality of the target data or the scan signal transmitted from the HMD 12 to the relay apparatus 16. In the hopping pattern notification sub-period P3, the new hopping pattern is notified from the relay apparatus 16 to the HMD 12.

FIG. 4 is a schematic diagram depicting an example of hopping pattern data denoting a hopping pattern of frequencies for communicating the target data.

This embodiment assumes, for example, that 81 channels associated with frequencies for use in communication and constituting hopping pattern candidates are set beforehand and that the channels are assigned channel identifiers CH2 to CH82. The hopping pattern data in FIG. 4 includes hopping indexes constituting hopping pattern indexes and the channel identifiers associated with these hopping indexes.

FIG. 5 is a schematic diagram depicting an example of scan pattern data for managing a transmission pattern of scan signals, i.e., of channels not included in the hopping pattern. The scan pattern data in FIG. 5 includes scan indexes that constitute scan signal transmission pattern indexes, and channel identifiers associated with the scan indexes.

Also in this embodiment, the channel to be used in each unit period is determined in accordance with the timing denoted by the timing management data of which an example is depicted in FIGS. 6A and 6B. FIG. 6A lists the timing management data for managing the channels to be used in the first through the 36th unit periods included in one communication cycle. FIG. 6B lists the timing management data for managing the channels to be used in the remaining unit periods. In this embodiment, the channels for use in the first through the 36th unit periods are determined on the basis of the timing management data in FIG. 6A, and the channels used in the remaining unit periods are determined in accordance with the timing management data in FIG. 6B.

The timing management data in FIGS. 6A and 6B include timing numbers, hopping indexes, and scan indexes. Each of these timing management data items is, for example, associated with one of 1,000 unit periods obtained by dividing an entire one-second-long communication cycle. For example, the timing management data item with the timing number of "n" is associated with an (n+1)th unit period lasting from the n-th millisecond to the (n+1)th millisecond in the entire communication cycle of 1 second.

The timing numbers included in the timing management data are integers ranging from 0 up to 999, for example, each number being associated with one of the unit periods making up one communication cycle as described above. In the unit period associated with each timing management data item, the channel associated with the hopping index included in the timing management data item is used to transmit the target data. For example, in the unit period associated with the timing management data item having the hopping index of 1, the channel CH2 is used to transmit the target data. In this embodiment, as depicted in FIGS. 6A and 6B, each of 50 channels associated with the hopping indexes of 1 to 50 is repeatedly used to transmit the target data.

Also in this embodiment, the timing management data is used to manage whether each of the unit periods in one communication cycle is to be a period A or a period B. For example, the timing management data associated with the periods A includes scan index values, whereas the timing management data associated with the periods B does not include scan index values. The channel associated with the scan index included in the timing management data item associated with a given period A in the hopping pattern data is used to transmit the scan signal. In the examples of FIGS. 6A and 6B, the unit periods associated with the timing numbers ending with the digit 9 or ranging from 900 up to 999 are periods B, and the remaining unit periods are periods A. Also in this embodiment, as depicted in FIGS. 6A and 6B, each of 31 channels associated with the scan index values of 1 to 31 is repeatedly used to transmit the scan signal.

In each communication cycle of this embodiment, the determination of a new hopping pattern is started in the unit period associated with the timing number of 900. The moment a new hopping pattern is determined, the notification of that hopping pattern is made in a period B.

For example, a new hopping pattern is determined on the basis of the reception quality of the target data and scan signal sent from the HMD 12 and received by the relay apparatus 16 in 900 unit periods with the timing numbers ranging from 0 up to 899.

The relay apparatus 16 of this embodiment is configured to receive multiple times the target data over each of the channels included in the hopping pattern during the 900-millisecond unit periods associated with the timing management data items having the timing numbers ranging from 0 up to 899. Also, the relay apparatus 16 of this embodiment is arranged to receive multiple time the scan signal over each of channels not included in the hopping pattern during the 900-millisecond period associated with the timing management data items having the timing numbers ranging from 0 up to 899.

In this embodiment, the number of times reception has been performed is specified over each channel for each quality level of the reception. Then on the basis of the reception count thus specified, an evaluation value representative of the quality level of the reception over each channel is determined.

Here, the sum of the products between the reception count for each specified reception quality level and a reference value for that quality level may be determined as the evaluation value, for example. If the reference value for normal reception is assumed to be represented by "a," the reference value for cyclic redundancy check (CRC) error reception by "b," and the reference value for non-reception by "c," then the value given as ((a×normal reception count+ b×CRC error reception count+c×non-reception count)×100/ total reception count) may be determined as the evaluation value. It is assumed here that the reference values "a," "b" and "c" are each between 0 and 1 inclusive. In this manner, a normalized value of up to 100 is determined as the evaluation value.

In the case where the same target data is transmitted multiple times as described above, each data transmission may be counted as part of the above-mentioned reception count. Alternatively, the consecutive multiple-time receiving of the data may be handled collectively as one-time reception. In the latter case, of the quality levels of the target data successively received multiple times, the quality level of which the reference value is the highest may be regarded as the reception quality associated with this multiple-time reception.

The evaluation value is not limited to what was discussed above. Alternatively, the packet arrival rate over each channel may be determined as the evaluation value of that channel.

In the relay apparatus 16, the channels to be included in the new hopping pattern are then determined. For example, 50 channels in descending order of evaluation values may be determined here as the new channels to be included in the new hopping pattern. The relay apparatus 16 notifies the HMD 12 of the newly determined hopping pattern. In the next communication cycle, the frequency hopping of the target data is carried out according to the new hopping pattern.

As explained above, the relay apparatus 16 of this embodiment evaluates the reception quality of communication over a given channel not included in the hopping pattern through the use of the reception quality of the scan signal actually transmitted over that channel from the HMD 12. The evaluation result of the reception quality of the actually transmitted scan signal is then used to determine a new hopping pattern. In this manner, the embodiment determines appropriately the frequency hopping pattern for data communication.

Also in this embodiment, as depicted in FIGS. 6A and 6B, the target data is further transmitted in 100 unit periods associated with the timing management data items having the timing numbers ranging from 900 up to 999. Notification of the hopping pattern is made at intervals between target data transmissions. In this manner, the embodiment can transmit the target data in any of the unit periods obtained by dividing the communication cycle.

Also, at the time the communication between the HMD 12 and the relay apparatus 16 is started, scan signals may be transmitted successively from the HMD 12 to the relay apparatus 16 over each channel. The first hopping pattern may then be determined on the basis of the reception quality levels of these scan signals. As a result of this, in the first communication cycle in which the target data is transmitted, the reception quality of the target data received by the relay apparatus 16 can be expected to be improved.

Furthermore, the target data transmitted from the HMD 12 to the relay apparatus 16 may include information indicative of whether or not the hopping pattern has been received (e.g., ACK or NACK). The relay apparatus 16 may retransmit the hopping pattern to the HMD 12 until the receipt of the hopping pattern is acknowledged.

Incidentally, the hopping pattern data, scan pattern data, and timing management data are not limited to those discussed above. FIGS. 7A and 7B depict another example of timing management data. In this example, 37 channels are included in the hopping pattern, and 44 channels are included in the scan pattern. For this reason, each hopping pattern data item used in this example has one of the integers ranging from 1 up to 37 as the hopping index. Each scan pattern data item in this example has one of the integers ranging from 1 up to 44 as the scan index.

In this example, each of the 37 channels associated with the hopping index values of 1 to 37 is repeatedly used to transmit the target data. Also, each of the 44 channels associated with the scan index values of 1 to 44 is repeatedly used to transmit the scan signal.

In this example, 37 channels in descending order of evaluation values determined as described above may be determined as the channels to be included in a new hopping pattern.

Also, in the hopping pattern notification sub-period P3, signals such as control signals generated by the entertainment apparatus 14 or by the relay apparatus 16 for the HMD 12 may be transmitted from the relay apparatus 16 to the HMD 12.

What follows is a further description of the functions of the HMD 12 and of the relay apparatus 16 of this embodiment as well as the processes performed by the HMD 12 and by the relay apparatus 16.

Figure 8:
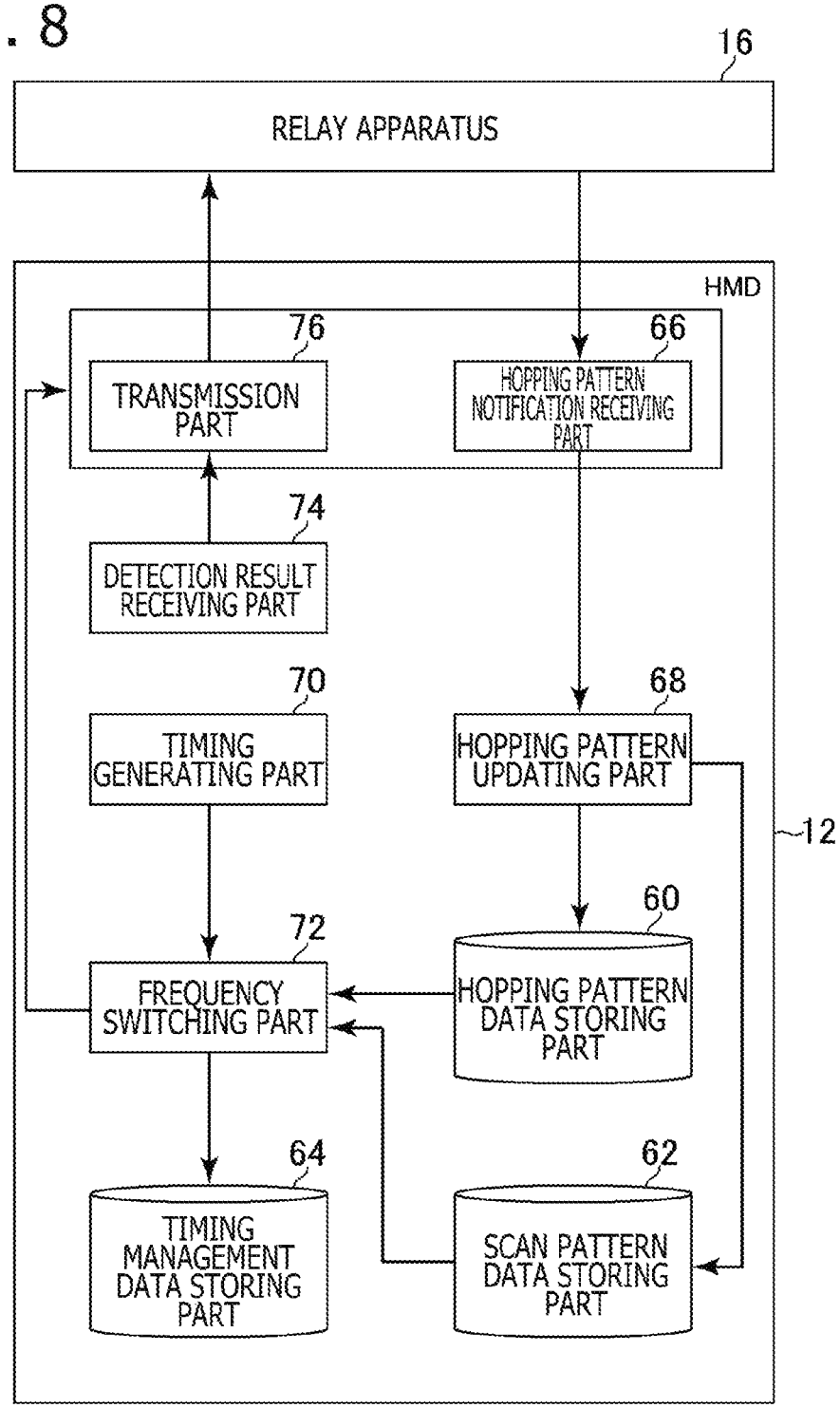
FIG. 8 is a functional block diagram depicting typical functions implemented by the head-mounted display as part of the embodiment.

FIG. 8 is a functional block diagram depicting typical functions implemented by the HMD 12 of the embodiment. It is to be noted that the HMD 12 of this embodiment need not implement all the functions depicted in FIG. 8 and that the HMD 12 may implement functions other than those found in FIG. 8.

As depicted in FIG. 8, the HMD 12 of this embodiment functionally includes, for example, a hopping pattern data storing part 60, a scan pattern data storing part 62, a timing management data storing part 64, a hopping pattern notification receiving part 66, a hopping pattern updating part 68, a timing generating part 70, a frequency switching part 72, a detection result receiving part 74, and a transmission part 76. The hopping pattern data storing part 60, scan pattern data storing part 62, and timing management data storing part 64 are implemented mainly using the storing part 32. The hopping pattern notification receiving part 66 and the transmission part 76 are implemented mainly using the communication part 34. The hopping pattern updating part 68, timing generating part 70, and frequency switching part 72 are implemented mainly using the control part 30. The detection result receiving part 74 is implemented mainly using the control part 30 and the sensor part 40.

The above-mentioned functions may be implemented by the control part 30 executing programs which are installed in the HMD 12 as a computer and which include the commands representing these functions. These programs, when supplied to the HMD 12, may be stored on computer-readable information storage media such as an optical disk, magnetic disk, magnetic tape, magneto-optical disk, or flash memory, or transmitted over the Internet, for example.

Figure 9:
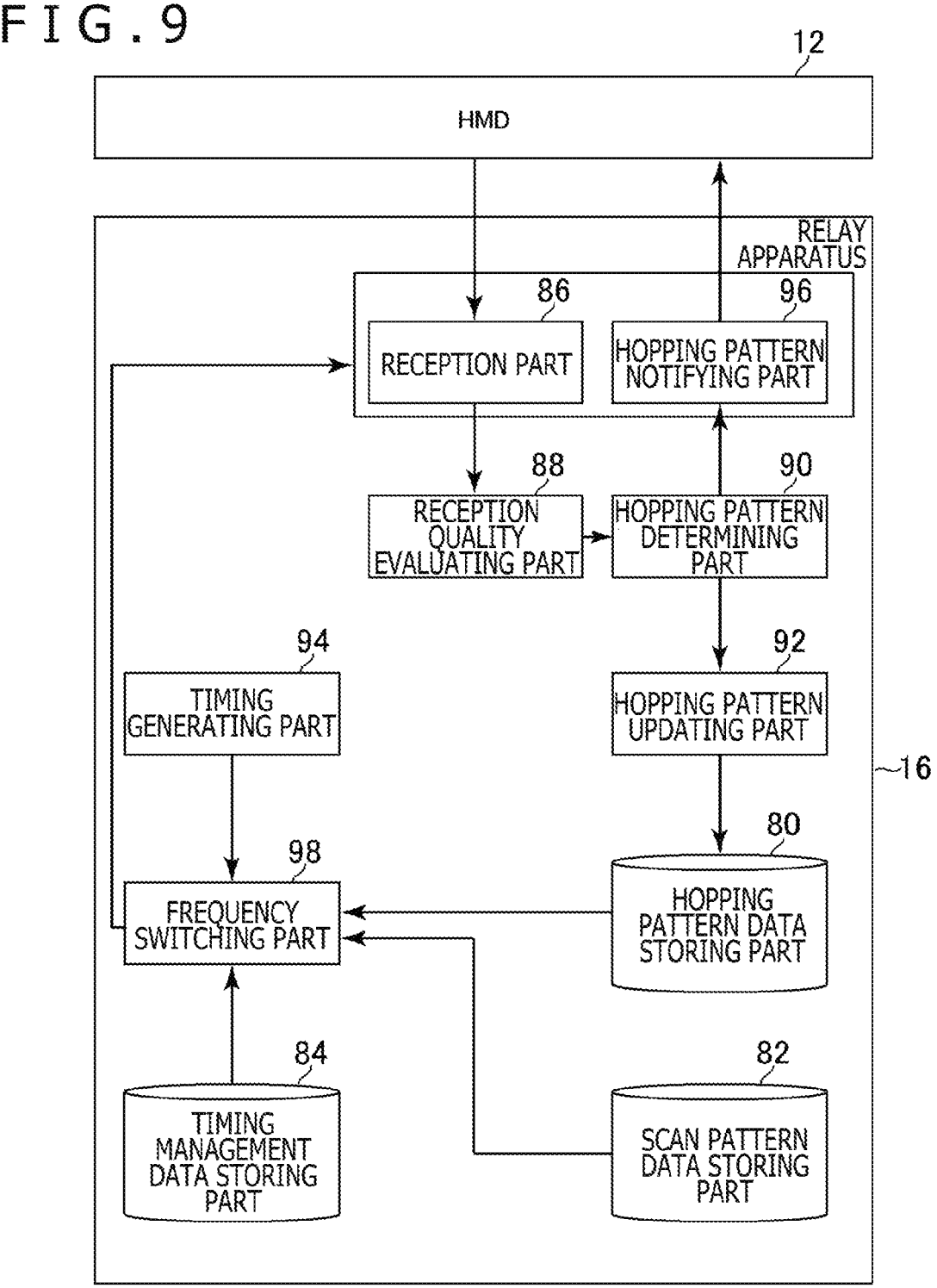
FIG. 9 is a functional block diagram depicting typical functions implemented by the relay apparatus as part of the embodiment.

FIG. 9 is a functional block diagram depicting typical functions implemented by the relay apparatus 16 of this embodiment. It is to be noted that the relay apparatus 16 of this embodiment need not implement all the functions depicted in FIG. 9 and that the relay apparatus 16 may implement functions other than those found in FIG. 9.

As illustrated in FIG. 9, the relay apparatus 16 of this functionally includes, for example, a hopping pattern data storing part 80, a scan pattern data storing part 82, a timing management data storing part 84, a reception part 86, a reception quality evaluating part 88, a hopping pattern determining part 90, a hopping pattern updating part 92, a timing generating part 94, a hopping pattern notifying part 96, and a frequency switching part 98. The hopping pattern data storing part 80, scan pattern data storing part 82, and timing management data storing part 84 are implemented mainly using the storage part 52. The reception part 86 and the hopping pattern notifying part 96 are implemented mainly using the communication part 54. The reception quality evaluating part 88, hopping pattern determining part 90, hopping pattern updating part 92, timing generating part 94, and frequency switching part 98 are implemented mainly using the control part 50.

The above-mentioned functions may be implemented by the control part 50 executing programs which are installed in the relay apparatus 16 as a computer and which include the commands representing these functions. These programs, when supplied to the relay apparatus 16, may be stored on computer-readable information storage media such as an optical disk, magnetic disk, magnetic tape, magneto-optical disk, or flash memory, or transmitted over the Internet, for example.

The hopping pattern data storing part 60 and the hopping pattern data storing part 80 of this embodiment store the above-described hopping pattern data, for example.

The scan pattern data storing part 62 and the scan pattern data storing part 82 of this embodiment store the above-described scan pattern data, for example.

The timing management data storing part 64 and the timing management data storing part 84 of this embodiment store the above-described timing management data, for example. In this embodiment, the timing management data stored in the timing management data storing part 64 is the same as the timing management data stored in the timing management data storing part 84.

The hopping pattern notification receiving part 66 of this embodiment receives, for example, notification of the hopping pattern transmitted from the relay apparatus 16.

When the new hopping pattern is determined as described above, for example, the hopping pattern updating part 68 of this embodiment updates the hopping pattern data stored in the hopping pattern data storing part 60 with the new hopping pattern. At the time the new hopping pattern is determined, the hopping pattern updating part 68 may update the scan pattern data stored in the scan pattern data storing part 62 with data that denotes channels not included in the new hopping pattern.

The timing generating part 70 of this embodiment generates, for example, a timing signal and outputs the generated timing signal to the frequency switching part 72.

The frequency switching part 72 of this embodiment switches, for example, frequencies at which the target data and scan signal are communicated by the communication part 34 in accordance with the hopping pattern denoted by the hopping pattern data stored in the hopping pattern data storing part 60. In this case, for example, the frequencies for communication via the hopping pattern notification receiving part 66 and transmission part 76 are switched. The frequency switching part 72 may instruct the communication part 34 to switch the channels for communication in accordance with the timing denoted by the timing signal received from the timing generating part 70.

The detection result receiving part 74 of this embodiment receives, for example, detection result data generated by the sensor part 40 at a predetermined sampling rate, the detection result data representing the position and direction of the HMD 12 or the changes in its position and direction.

The transmission part 76 of this embodiment transmits, for example, the above-described target data and scan signal to the relay apparatus 16. In this embodiment, as described above, the transmission part 76 transmits the scan signal in the periods where the target data is not communicated, the scan signal being transmitted at frequencies different from those of the hopping pattern to the communication part 54 in the relay apparatus 16. The transmission part 76 may generate the target data on the basis of the detection result data received by the detection result receiving part 74, and transmit the generated target data to the relay apparatus 16. Also, the transmission part 76 may switch frequencies for data communication on the basis of frequency switching instructions received from the frequency switching part 72, for example. In this case, the channels for data communication may alternatively be switched on the basis of channel switching instructions received from the frequency switching part 72.

The reception part 86 of this embodiment receives, for example, the target data and scan signal transmitted from the transmission 76. Upon receipt of the target data, the reception part 86 transfers the target data to the entertainment apparatus 14.

The reception quality evaluating part 88 of this embodiment evaluates, for example, the reception quality of the target data and scan signal received by the reception part 86. The reception quality evaluating part 88 calculates an evaluation value of the reception quality on each channel, for example.

The hopping pattern determining part 90 of this embodiment determines a new hopping pattern on the basis of the reception quality of the scan signal received by the communication part 54, for example. Here, the hopping pattern determining part 90 may alternatively determine the new hopping pattern on the basis of the reception quality of the target data and the reception quality of the scan signal.

The hopping pattern updating part 92 of this embodiment updates the hopping pattern data stored in the hopping pattern data storing part 80 with data that denotes a new hopping pattern when, for example, the new hopping pattern is determined as described above. At the time the new hopping pattern is determined, the hopping pattern updating part 92 may update the scan pattern data stored in the scan pattern data storing part 82 with data that denotes channels not included in the new hopping pattern.

The timing generating part 94 of this embodiment generates, for example, a timing signal and outputs the generated timing signal to the frequency switching part 98.

Incidentally, it is assumed for this embodiment that the timing signal output from the timing generating part 70 is synchronized with the timing signal output from the timing generating part 94. In this case, for example, upon receipt of a first packet of consecutively received target data, the relay apparatus 16 may perform timing signal synchronization in keeping with the timing of the HMD 12.

The hopping pattern notifying part 96 of this embodiment notifies the HMD 12 of the new hopping pattern determined by the hopping pattern determining part 90, for example.

The frequency switching part 98 of this embodiment switches, for example, frequencies for communication via the communication part 54 in accordance with the hopping pattern denoted by the hopping pattern data stored in the hopping pattern data storing part 80. In this case, for example, the frequencies used by the reception part 86 and hopping pattern notifying part 96 for communication are switched. For example, the frequency switching part 98 instructs the communication part 54 to switch the channels used for communication in accordance with the timing denoted by the timing signal received from the timing generating part 94.

Figure 10:
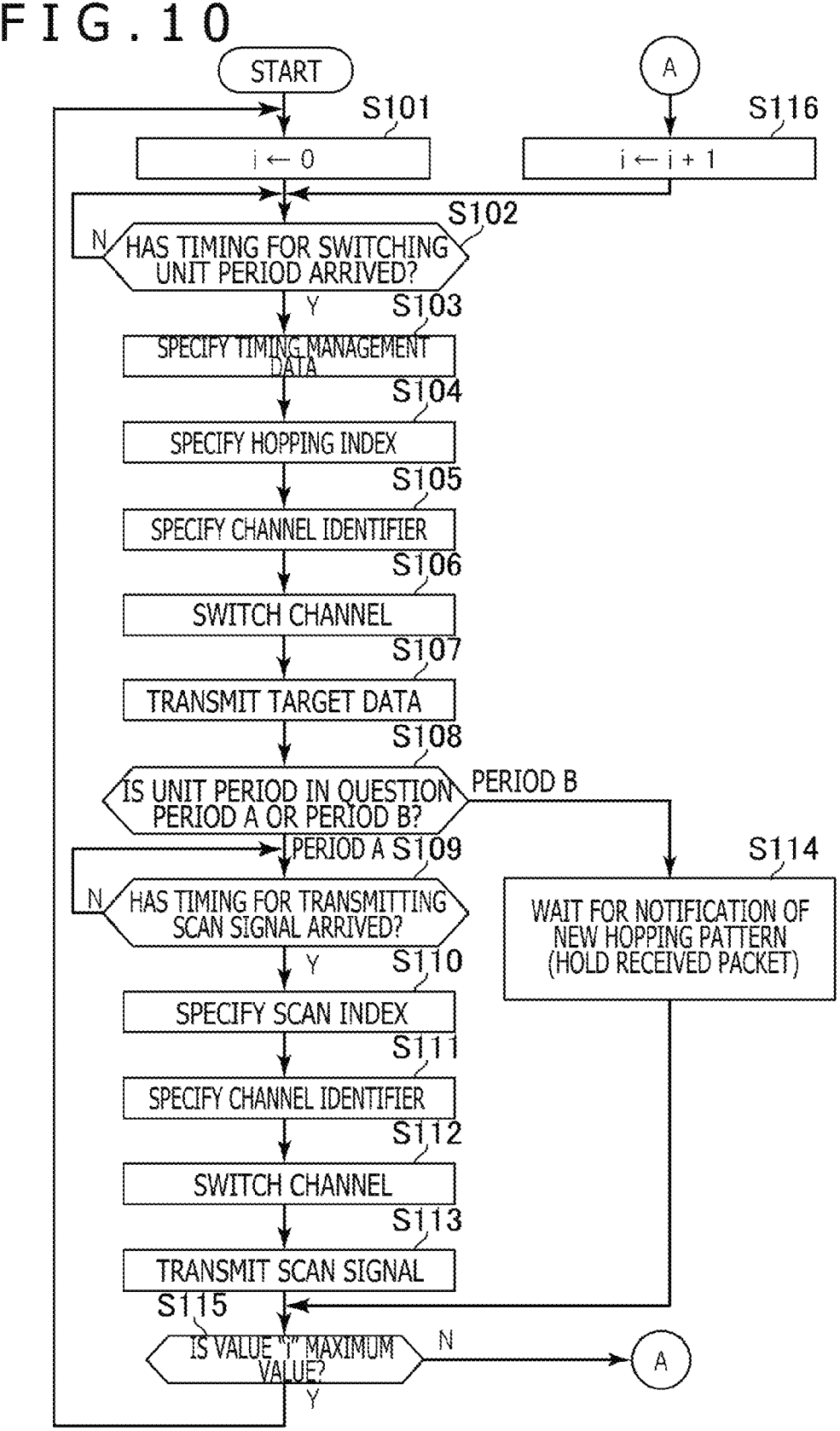
FIG. 10 is a flowchart depicting a typical flow of processing performed by the head-mounted display as part of the embodiment.

Explained below with reference to the flowchart of FIG. 10 is a typical flow of the process of transmitting the target data and scan signal and the process of receiving notification of the hopping pattern, the processes being performed by the HMD 12 of this embodiment. With this embodiment, it is assumed that the frequency switching part 72 holds the value "i" denoting the timing number.

The frequency switching part 72 first sets 0 to the value "i" (S101).

The frequency switching part 72 then monitors (S102) whether or not the timing for switching the unit period has arrived by referencing the timing signal received from the timing generating part 70.

When the timing for switching the unit period is verified to have arrived, the frequency switching part 72 specifies (S103) the timing management data item of which the timing number is "i," the timing management data item being stored in the timing management data storing part 64.

The frequency switching part 72 then specifies (S104) the hopping index included in the timing management data item specified in the step of S103. From the hopping pattern data stored in the hopping pattern data storing part 60, the frequency switching part 72 specifies (S105) the channel identifier associated with the hopping index specified in the step of S104.

The frequency switching part 72 then switches (S106) the channel for use in communication via the communication part 34 to the channel identified by the channel identifier specified in the step of S105.

Using the channel switched in the step of S106, the transmission part 76 transmits (S107) to the relay apparatus 16 the target data reflecting the most recent detection result received by the detection result receiving part 74. Here, the same target data may be transmitted multiple times (e.g., three times) as discussed above.

On the basis of the timing management data item specified in the step of S103, the frequency switching part 72 specifies whether the unit period in question is a period A or a period B (S108). Given that the timing management data item corresponding to a period B does not include a scan index value as explained above, it is possible to specify whether the unit period in question is a period A or a period B.

In the case where the unit period is specified to be a period A in the step of S108, the frequency switching part 72 monitors (S109) whether or not the timing for transmitting the scan signal has arrived by referencing the timing signal received from the timing generating part 70. Here, the timing for transmitting the scan signal may be predetermined to be 0.7 milliseconds after the timing at which the unit period is switched, for example.

When the timing for transmitting the scan signal is verified to have arrived here, the frequency switching part 72 specifies (S110) the scan index included in the timing management data item specified in the step of S103. From the scan pattern data stored in the scan pattern data storing part 62, the frequency switching part 72 specifies (S111) the channel identifier associated with the scan index specified in the step of S110.

The frequency switching part 72 then switches (S112) the channel for communication via the communication part 34 to the channel identified by the channel identifier specified in the step of S111.

The transmission part 76 then transmits (S113) the scan signal to the relay apparatus 16 using the channel switched in the step of S112.

On the other hand, in the case where the unit period in question is specified to be a period B in the step of S108, the hopping pattern notification receiving part 66 waits (S114) for notification of a new hopping pattern to be transmitted from the relay apparatus 16. In this embodiment, the notification of a new hopping pattern is divided into packets before being transmitted from the relay apparatus 16 as explained above. When a packet constituting part of the notification of the new hopping pattern is received in the waiting unit period of the step of S114, the hopping pattern notification receiving part 66 holds the packet.

After the step of S113 or S114, the frequency switching part 72 verifies (S115) whether or not the value "i" being held is the maximum timing number (e.g., 999) included in the timing management data. In the case where the value "i" is not the maximum number (N in S115), the frequency switching part 72 increments the value "i" by 1 (S116) and returns to the step of S102. In the case where the value "i" is the maximum number (Y in S115), the frequency switching part 72 returns to the step of S101.

As described above, the frequency switching part 72 of this embodiment performs control to make the communication part 34 execute two operations alternately, one of the two operations being communication of the target data according to the hopping pattern, the other operation being transmission of the scan signal at frequencies different from those of the hopping pattern. Alternatively, as discussed above, the frequency switching part 72 may perform control to make the communication part 34 execute two other operations alternately, one operation being consecutive multiple-time transmission of the same target data at one of the frequencies included in the hopping pattern, the other operation being transmission of the scan signal at frequencies different from those of the hopping pattern.

Also as discussed above, the frequency switching part 72 may perform control to make the communication part 34 transmit the scan signal at a frequency different form that of the immediately preceding transmission of the scan signal while transmitting the scan signal at frequencies different from those of the hopping pattern.

Also as described above, the frequency switching part 72 may perform control to make the communication part 34 transmit the scan signal multiple times at a given frequency after the hopping pattern is determined until the next hopping pattern is determined.

Figure 11:
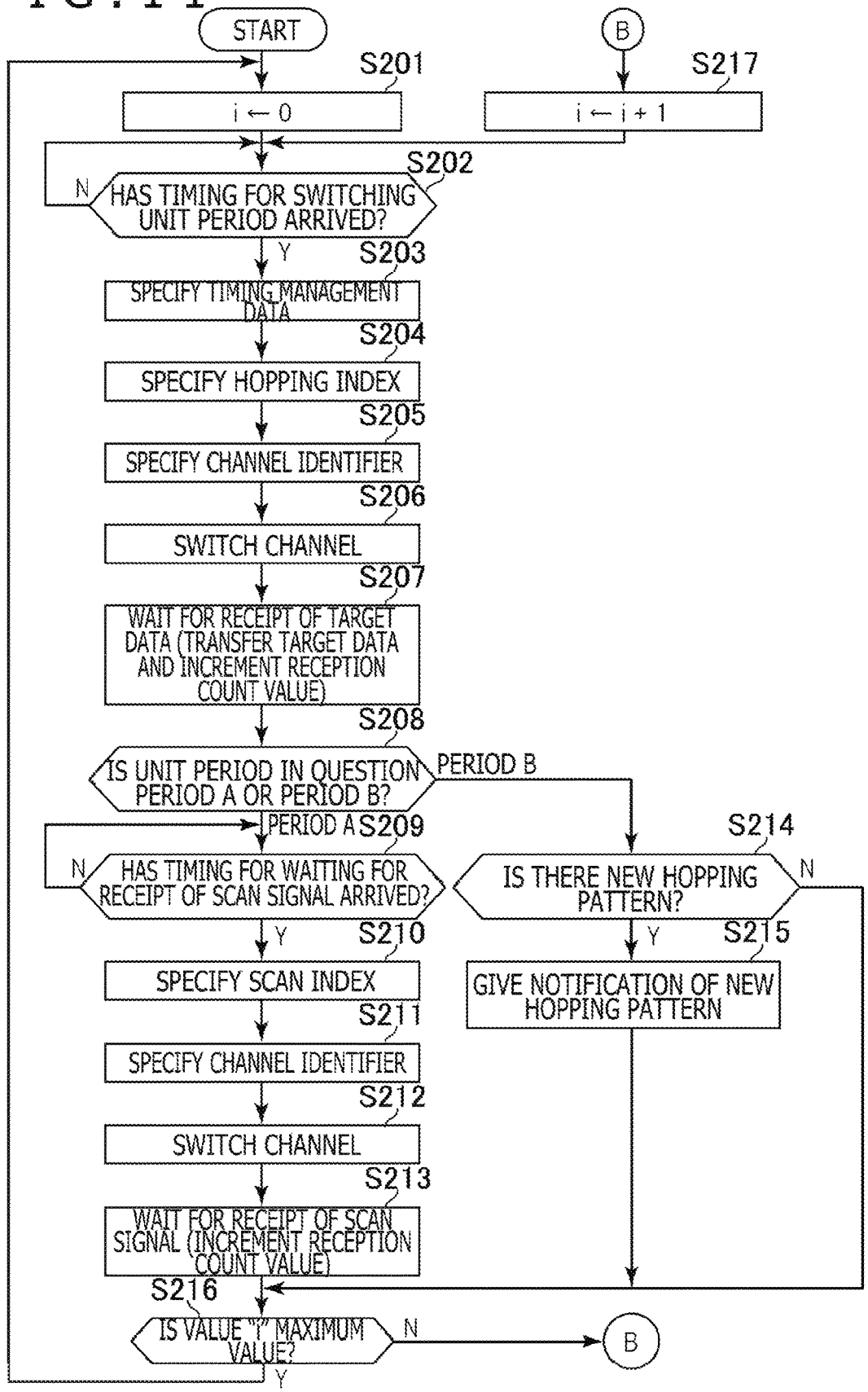
FIG. 11 is a flowchart depicting a typical flow of processing performed by the relay apparatus as part of the embodiment.

Explained next with reference to the flowchart of FIG. 11 is a typical flow of the process of receiving the target data and scan signal and the process of notification of a new hopping pattern, the processes being performed by the relay apparatus 16 of this embodiment. With this embodiment, it is assumed that the frequency switching part 98 holds the value "i" denoting the timing number. It is also assumed with this embodiment that the reception quality evaluating part 88 holds the reception count value for each combination of the channel number and the reception quality.

The frequency switching part 98 first sets 0 to the value "i" (S201).

The frequency switching part 98 then monitors (S202) whether or not the timing for switching the unit period has arrived by referencing the timing signal received from the timing generating part 94.

When the timing for switching the unit period is verified to have arrived, the frequency switching part 98 specifies (S203) the timing management data item of which the timing number is "i," the timing management data being stored in the timing management data storing part 84.

The frequency switching part 98 then specifies (S204) the hopping index included in the timing management data item specified in the step of S203. From the hopping pattern data stored in the hopping pattern data storing part 80, the frequency switching part 98 specifies (S205) the channel identifier associated with the hopping index specified in the step of S204.

The frequency switching part 98 then switches (S206) the channel for communication via the communication part 54 to the channel identified by the channel identifier specified in the step of S205.

On the channel switched in the step of S206, the reception part 86 waits (S207) for receipt of the target data to be transmitted from the HMD 12.

When the target data is normally received in the waiting period of the step of S207, the reception part 86 transfers the received target data to the entertainment apparatus 14. Also, when the target data is received in the waiting period of the step of S207, the reception part 86 notifies the reception quality evaluating part 88 of the channel number of the channel over which the target data is received and the reception quality of the target data. Upon receipt of the notification, the reception quality evaluating part 88 increments by 1 the reception count value being held for the combination of the channel number and the reception quality. In this case, as discussed above, the reception part 86 may handle the consecutive multiple-time receiving of the data collectively as one-time reception.

On the basis of the timing management data item specified in the step of S203, the frequency switching part 98 specifies whether the unit period in question is a period A or a period B (S208).

In the case where the unit period in question is specified to be a period A in the step of S208, the frequency switching part 98 monitors (S209) whether or not the timing for waiting for receipt of the scan signal has arrived by referencing the timing signal received from the timing generating part 94. Here, the timing for waiting for receipt of the scan signal may be predetermined to be 0.7 milliseconds after the timing at which the unit period is switched, for example.

When the timing for waiting for receipt of the scan signal is verified to have arrived here, the frequency switching part 98 specifies (S210) the scan index included in the timing management data item specified in the step of S203. From the scan pattern data stored in the scan pattern data storing part 82, the frequency switching part 98 specifies (S211) the channel identifier associated with the scan index specified in the step of S210.

The frequency switching part 98 then switches (S212) the channel for communication via the communication part 54 to the channel identified by the channel identifier specified in the step of S211.

The reception part 86 then waits (S213) for receipt of the scan signal to be transmitted from the HMD 12, using the channel switched in the step of S212.

When the scan signal is received in the waiting period of the step of S213, the reception part 86 notifies the reception quality evaluating part 88 of the channel number of the channel over which the scan signal is received and the reception quality of the scan signal. Upon receipt of the notification, the reception quality evaluating part 88 increments by 1 the reception count value being held for the combination of the channel number and the reception quality.

On the other hand, in the case where the unit period in question is specified to be a period B in the step of S208, the hopping pattern notifying part 96 verifies (S214) whether or not there is a new hopping pattern targeted for notification. When it is verified that there exists a new hopping pattern targeted for notification (Y in S214), the hopping pattern notifying part 96 notifies the HMD 12 of the new hopping pattern (S215). Here, a packet constituting part of the notification of the new hopping pattern is transmitted, for example.

Suppose that no new hopping pattern targeted for notification is verified to exist (N in S214) or that the step of S213 or S215 has ended. In such a case, the frequency switching part 98 verifies (S216) whether or not the value "i" being held is the maximum timing number (e.g., 999) included in the timing management data. In the case where the value "i" is not the maximum number (N in S216), the frequency switching part 98 increments the value "i" by 1 (S217) and returns to the step of S202. In the case where the value "i" is the maximum number (Y in S216), the frequency switching part 98 returns to the step of S201.

Figure 12:
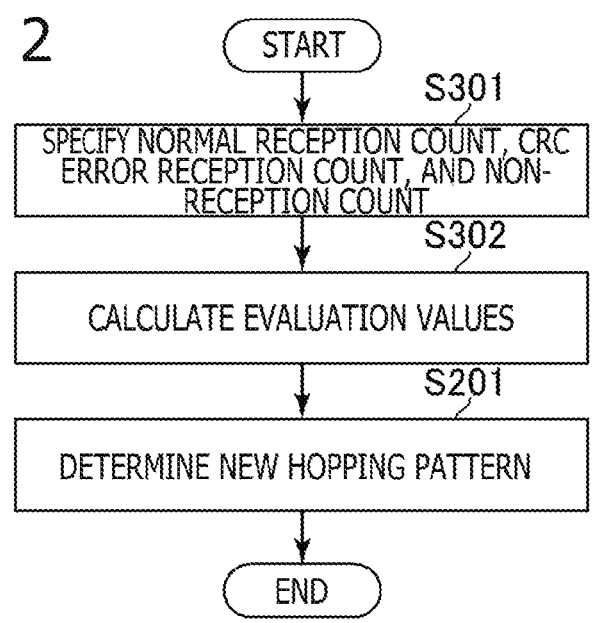
FIG. 12 is a flowchart depicting another typical flow of processing performed by the relay apparatus as part of the embodiment.

Explained next with reference to the flowchart of FIG. 12 is a typical flow of the process of determining a new hopping pattern, the process being performed by the relay apparatus 16 of this embodiment. With this embodiment, it is assumed that the timing for starting to determine a new hopping pattern is 0.9 seconds after the timing at which the unit period is switched, for example.

When the timing for starting to determine a new hopping pattern has arrived, the reception quality evaluating part 88 specifies (S301), for each channel, the normal reception count, CRC error reception count, and non-reception count on the basis of the reception count values being held. In this case, for example, the non-reception count may be specified by subtracting the normal reception count and the CRC error reception count from a given total reception count.

The reception quality evaluating part 88 then calculates (S302), as described above, the evaluation value of each channel on the basis of the reception count specified in the step of S301.

On the basis of the evaluation value of each channel calculated in the step of S302, the hopping pattern determining part 90 determines a new hopping pattern (S303). In this case, for example, the hopping pattern determining part 90 may determine, as a new hopping part, a pattern that includes a predetermined number (e.g., 50) of channels in descending order of evaluation values calculated by the reception quality evaluating part 88.

In the manner described above, the hopping pattern determining part 90 of this embodiment determines the new hopping pattern on the basis of the reception quality of the target data received by the communication part 54 and the reception quality of the scan signal also received by the communication part 54.

The notification of the new hopping pattern thus determined is divided into multiple packets by the hopping pattern notifying part 96 before being transmitted to the HMD 12 over multiple unit periods in the above-described step of S214.

Suppose that the hopping pattern notification receiving part 66 of the HMD 12 has confirmed the receipt of all packets constituting the new hopping pattern. In that case, the hopping pattern updating part 68 generates new hopping pattern data and new scan pattern data on the basis of the notification of the new hopping pattern.

The hopping pattern updating part 68 of the HMD 12 then stores the newly generated hopping pattern data into the hopping pattern data storing part 60. The hopping pattern updating part 68 of the HMD 12 also stores the newly generated scan pattern data into the scan pattern data storing part 62.

Suppose also that the hopping pattern notification receiving part 66 of the HMD 12 has confirmed the receipt of all packets constituting the new hopping pattern. In that case, the transmission part 76 of the HMD 12 transmits to the relay apparatus 16 information (e.g., ACK) indicative of normal reception of the notification of the new hopping pattern. Here, the information indicative of normal reception may be included in the target data transmitted at the timing of the above-described step of S107.

Suppose further that the reception part 86 of the relay apparatus 16 has received the information indicative of normal reception of the notification of the new hopping pattern. In that case, the hopping pattern updating part 92 generates new hopping pattern data and new scan pattern data on the basis of the new hopping pattern determined in the above-described step of S303.

The hopping pattern updating part 92 of the relay apparatus 16 then stores the newly generated hopping pattern data into the hopping pattern data storing part 80. The hopping pattern updating part 92 of the relay apparatus 16 also stores the newly generated scan pattern data into the scan pattern data storing part 82.

The new hopping pattern data and the new scan pattern data thus stored start to be used upon arrival of the timing for starting the next communication cycle. In this manner, the hopping pattern data and the scan pattern data are synchronized between the HMD 12 and the relay apparatus 16 of this embodiment.

It is to be noted that every time the timing for starting the next communication cycle has arrived, the reception quality evaluating part 88 updates to zero the currently held reception count value for every combination of the channel number and the reception quality. Alternatively, every time the timing for starting the next communication cycle has arrived, the reception quality evaluating part 88 may update the currently held reception count value for every combination of the channel number and the reception quality to a predetermined multiple (e.g., half) of the current value, instead of updating every count value to zero. This makes it possible to reduce fluctuations in the evaluation result of the reception quality even in the case of radio wave status being changed considerably in a short period of time.

Incidentally, the hopping pattern notifying part 96 may repeatedly transmit the new hopping pattern to the HMD 12 until receipt of the information denoting the normal reception of the new hopping pattern.

It is to be noted that the present invention is not limited to the above-described embodiments.

For example, the present invention may be applied generically to all situations where a first communication apparatus transmits the target data wirelessly to a second communication apparatus. As another example, the present invention may be applied to the situation where the data denoting the input operations to the controller 22 is transmitted from the controller 22 to the entertainment apparatus 14. In this case, the functions implemented by the HMD 12 of this embodiment and depicted in FIG. 8 are implemented by the controller 22, and the functions implemented by the relay apparatus 16 and illustrated in FIG. 9 are implemented by the entertainment apparatus 14.

It is also to be noted that specific character strings and numerical values found in the foregoing description as well as specific character strings and numerical values in the accompanying drawings are only examples and are not limitative of the present invention.

The invention claimed is:

1. A communication system comprising: a first communication apparatus and a second communication apparatus;
   the first communication apparatus including:
   a first communication part;
   a first storage part configured to store hopping pattern data denoting a hopping pattern of frequencies for data communication; and
   a first control part configured to switch the frequencies for data communication with the first communication part in accordance with the hopping pattern;
   the second communication apparatus including:
   a second communication part;
   a second storage part configured to store the hopping pattern data; and
   a second control part configured to switch the frequencies for data communication with the second communication part in accordance with the hopping pattern;
   wherein, over a period where data communication is not performed, the first communication part transmits a signal to the second communication part at frequencies different from those of the hopping pattern; and
   the second control part determines a new hopping pattern on the basis of reception quality of the signal received by the second communication part.

2. The communication system according to claim 1, wherein the second control part determines the new hopping pattern on the basis of the reception quality of data transmitted from the first communication part at frequencies included in the hopping pattern and received by the second communication part and the reception quality of the signal transmitted from the first communication part and received by the second communication part.

3. The communication system according to claim 1, wherein the first control part performs control to make the first communication part execute two operations alternately, one of the two operations being communication of the data in accordance with the hopping pattern, the other operation being transmission of the signal at frequencies different from those of the hopping pattern.

4. The communication system according to claim 1, wherein the first control part performs control to make the first communication part execute two operations alternately, one of the two operations being consecutive multiple-time transmission of the same data at one of the frequencies included in the hopping pattern, the other operation being transmission of the signal at frequencies different from those of the hopping pattern.

5. The communication system according to claim 3, wherein the first control part performs control to make the first communication part transmit the signal at a frequency different form that of the immediately preceding transmission of the signal while transmitting the signal at frequencies different from those of the hopping pattern.

6. The communication system according to claim 1, wherein the first control part performs control to make the first communication part transmit the signal multiple times at a frequency after the hopping pattern is determined until another hopping pattern is determined.

7. A communication apparatus comprising:
   a communication part;
   a storage part configured to store hopping pattern data denoting a hopping pattern of frequencies for data communication; and a control part configured to switch the frequencies for data communication with the communication part in accordance with the hopping pattern;

wherein, over a period where data communication is not performed, the communication part transmits a signal at frequencies different from those of the hopping pattern.

8. A communication apparatus comprising:

a communication part;

a storage part configured to store hopping pattern data denoting a hopping pattern of frequencies for data communication; and a control part configured to switch the frequencies for data communication with the communication part in accordance with the hopping pattern;

wherein, over a period where data communication is not performed, the communication part receives a signal at frequencies different from those of the hopping pattern; and the control part determines a new hopping pattern on the basis of reception quality of the signal received by the communication part.

9. A communication method comprising:

switching frequencies of a hopping pattern for data communication with a communication part in accordance with the hopping pattern denoted by hopping pattern data stored in a storage part; and transmitting a signal at frequencies different from those of the hopping pattern over a period where data communication is not performed.

10. A hopping pattern determining method comprising:

switching frequencies of a hopping pattern for data communication with a communication part in accordance with the hopping pattern denoted by hopping pattern data stored in a storage part;

receiving a signal at frequencies different from those of the hopping pattern over a period where data communication is not performed; and determining a new hopping pattern on the basis of reception quality of the signal received by the communication part.

11. A non-transitory, computer readable storage medium containing a computer program, which when executed by a computer, causes the computer to carry out actions, comprising:

switching frequencies of a hopping pattern for data communication with a communication part in accordance with the hopping pattern denoted by hopping pattern data stored in a storage part; and transmitting a signal at frequencies different from those of the hopping pattern over a period where data communication is not performed.

12. A non-transitory, computer readable storage medium containing a computer program, which when executed by a computer, causes the computer to carry out actions, comprising:

switching frequencies of a hopping pattern for data communication with a communication part in accordance with the hopping pattern denoted by hopping pattern data stored in a storage part;

receiving a signal at frequencies different from those of the hopping pattern over a period where data communication is not performed; and determining a new hopping pattern on the basis of reception quality of the signal received by the communication part.

* * * * *